US011361200B2

(12) United States Patent
Ardulov et al.

(10) Patent No.: US 11,361,200 B2
(45) Date of Patent: Jun. 14, 2022

(54) SYSTEM AND METHOD FOR LEARNING CONTEXTUALLY AWARE PREDICTIVE KEY PHRASES

(71) Applicant: HRL Laboratories, LLC, Malibu, CA (US)

(72) Inventors: Victor Ardulov, Long Beach, CA (US); Aruna Jammalamadaka, Agoura Hills, CA (US); Tsai-Ching Lu, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 356 days.

(21) Appl. No.: 16/710,640

(22) Filed: Dec. 11, 2019

(65) Prior Publication Data

US 2020/0258120 A1 Aug. 13, 2020

Related U.S. Application Data

(60) Provisional application No. 62/804,016, filed on Feb. 11, 2019, provisional application No. 62/815,304, filed on Mar. 7, 2019.

(51) Int. Cl.
*G06K 9/62* (2022.01)
*G06F 16/907* (2019.01)
(Continued)

(52) U.S. Cl.
CPC ......... *G06K 9/6289* (2013.01); *G06F 16/907* (2019.01); *G06F 16/90335* (2019.01);
(Continued)

(58) Field of Classification Search
CPC ............ G06K 9/6289; G06F 16/90335; G06F 16/907; G06F 40/166; G06F 40/205;
(Continued)

(56) References Cited

U.S. PATENT DOCUMENTS

2015/0302315 A1   10/2015   Ahn
2017/0308678 A1   10/2017   Apreleva et al.

FOREIGN PATENT DOCUMENTS

AU    2013257529 A1 *  6/2014  ............. H02S 50/10
EP       3391252 A1    10/2018

OTHER PUBLICATIONS

Dokyun Lee, Advertising Content and Consumer Engagement on Social Media: Evidence from Facebook, 2018 (Year: 2018).*

(Continued)

*Primary Examiner* — Tarek Elchanti
(74) *Attorney, Agent, or Firm* — Tope-McKay & Assc

(57) ABSTRACT

Described is a system for learning and predicting key phrases. The system learns based on a dataset of historical forecasting questions, their associated time-series data for a quantity of interest, and associated keyword sets. The system learns the optimal policy of actions to take given the associated keyword sets and the optimal set of keywords which are predictive of the quantity of interest. Given a new forecasting question, the system extracts an initial keyword set from a new forecasting question, which are perturbed to generate an optimal predictive key-phrase set. Key-phrase time-series data are extracted for the optimal predictive key-phrase set, which are used to generate a forecast of future values for a value of interest. The forecast can be used for a variety of purposes, such as advertising online.

18 Claims, 10 Drawing Sheets

(51) Int. Cl.
*G06N 20/00* (2019.01)
*G06F 40/284* (2020.01)
*G06F 40/205* (2020.01)
*G06N 3/08* (2006.01)
*G06F 16/903* (2019.01)
*G06F 40/166* (2020.01)
*G06F 40/40* (2020.01)
*G06Q 30/02* (2012.01)
*G06Q 50/00* (2012.01)

(52) U.S. Cl.
CPC .......... *G06F 40/166* (2020.01); *G06F 40/205* (2020.01); *G06F 40/284* (2020.01); *G06F 40/40* (2020.01); *G06N 3/08* (2013.01); *G06N 20/00* (2019.01); *G06Q 30/0202* (2013.01); *G06Q 30/0255* (2013.01); *G06Q 50/01* (2013.01)

(58) Field of Classification Search
CPC ......... G06F 40/284; G06F 40/40; G06N 3/08; G06N 20/00; G06N 3/006; G06N 3/0427; G06N 3/084; G06N 5/022; G06N 7/005; G06Q 30/0202; G06Q 30/0255; G06Q 50/01; G06Q 30/02; G06Q 30/0283; G06Q 10/04
USPC .......................................................... 706/25
See application file for complete search history.

(56) References Cited

OTHER PUBLICATIONS

Notification of and the International Preliminary Report on Patentability Chapter II for PCT/US2019/065694; dated Oct. 19, 2020.
Carta et al., Forecasting E-Commerce Products Prices by Combining an Autoregressive Integrated Moving Average (ARIMA) Model and Google Trends Data, Future Internet 2019, 11, 5, Published: Dec. 24, 2018, pp. 1-19.
Bandara et al., Sales Demand Forecast in E-commerce using a Long Short-Term Memory Neural Network Methodology, arXiv, Jan. 13, 2019, pp. 1-8.
Wei et al., A Prediction Study on E-commerce Sales Based on Structure Time Series Model and Web Search Data, 2014 26th Chinese Control and Decision Conference (CCDC), IEEE, 2014, pp. 5346-5351.
Notification of Transmittal, The International Search Report, and the Written Opinion of the International Searching Authority for PCT/US2019/065694; dated Feb. 18, 2020.
HRL Laboratories et al: "HFC-MATRICS Episode 01 : What is Hybrid Forecasting?", Youtube, Jun. 11, 2018 (Jun. 11, 2018), p. 2 pp., XP054980192, Retrieved from the Internet: URL:https://www.youtube.com/watch?v=hWmKwsB_VtE [retrieved on Feb. 4, 2020] the whole document.
Choi, Hyunyoung, and Hal Varian. "Predicting the present with Google Trends." Economic Record 88 (2012): pp. 2-9.
Scott, Steven L., and Hal R. Varian. "Predicting the present with Bayesian structural time series." International Journal of Mathematical Modelling and Numerical Optimisation 5.1-2 (2014): pp. 4-23.
Pavlicek, Jaroslav, and Ladislav Kristoufek. "Nowcasting unemployment rates with google searches: Evidence from the visegrad group countries." PloS one 10.5 (2015): e0127084.
Scott, Steven L., and Hal R. Varian. "Bayesian variable selection for nowcasting economic time series." Economic analysis of the digital economy. University of Chicago Press, 2015. pp. 119-135.
Duygu Balcan et al., Modeling the spatial spread of infectious diseases: The GLobal Epidemic and Mobility computational model, Journal of Computational Science, vol. 1, Issue 3, 2010, pp. 132-145.
Dugas AF, Jalalpour M, Gel Y, Levin S, Torcaso F, et al. (2013) Influenza Forecasting with Google Flu Trends. PLOS ONE 8(2): e56176.
Ramakrishnan, Naren et al. 'Beating the News' with EMBERS: Forecasting Civil Unrest Using Open Source Indicators Proceedings of the 20th ACM SIGKDD International Conference on Knowledge Discovery and Data Mining, 2014, pp. 1799-1808.
Compton, Ryan, et al. "Using publicly visible social media to build detailed forecasts of civil unrest." Security informatics 3.1 (2014): 4, pp. 1-10.
Gentzkow, Matthew, Bryan T. Kelly, and Matt Taddy. Text as data. No. w23276. National Bureau of Economic Research, 2017, pp. 1-54.
Kishimoto A and Muller M., From Deep Blue to Monte Carlo: ! An Update on Game Tree Research. In Tutorials for AAAI (2014).
Lanctot, M., Winands, M. H. M., Pepels, T. & Sturtevant, N. R., Monte Carlo tree search with heuristic evaluations using implicit minimax backups. In IEEE Conference on Computational Intelligence and Games, pp. 1-8 (2014).
Silver, David et al. Mastering the game of Go with deep neural networks and tree search. In Nature vol. 529, pp. 484-489 (Jan. 28, 2016).
Diederik P. Kingma and Jimmy Ba, Adam: A Method for Stochastic Optimization. In International Conference on Learning Representations (2015), pp. 1-15.
SpaCy Python Library, found at https : // spacy. io /, taken 2018, pp. 10-15.

* cited by examiner

400

SYSTEM AND METHOD FOR LEARNING CONTEXTUALLY AWARE PREDICTIVE KEY PHRASES

CROSS-REFERENCE TO RELATED APPLICATIONS

This application claims the benefit of and is a non-provisional patent application of U.S. Provisional Application No. 62/804,016, filed on Feb. 11, 2019, the entirety of which is hereby incorporated by reference.

The present application is ALSO a non-provisional patent application of U.S. Provisional Application No. 62/815,304, filed on Mar. 7, 2019, the entirety of which is hereby incorporated by reference.

GOVERNMENT RIGHTS

This invention was made with government support under U.S. Government Contract Number 2017-17061500006 MATRICS (Machine-aided Analytic Triage with Intelligent Crowd Sourcing). The government has certain rights in the invention.

BACKGROUND OF INVENTION

(1) Field of Invention

The present invention relates to a system for learning key phrases and, more specifically, to a system for selection of optimal predictors in time-series forecasting.

(2) Description of Related Art

Time-series forecasting is a technique utilized by analysts and decision-makers to gain insight about values of interest using available information. For example, financial policy makers must incorporate and be able to accurately predict the value of resources in order to assign tariffs and taxes while avoiding damage to long-term economics. As a result, such policy makers need to construct accurate predictive models that project the value of interest. Researchers have attempted to devise a variety of techniques for generating such forecasts. By way of example, Bayesian Structure Time-Series (BSTS) Models have been shown to effectively forecast economic indicators such as unemployment (see the List of Incorporated Literature References, Literature Reference Nos. 1-4), disease spread (see Literature Reference Nos. 5-6), and occurrences of civil unrest (see Literature Reference Nos. 7-8) with key phrase trend data from search engines and social media. While such research demonstrated that the models can forecast economic indicators with key phrases, finding these key phrases traditionally requires expert domain knowledge, and they are often not directly reusable in subsequent forecasting questions with similar or related topics.

Further, current time-series forecasting models have focused on using a large set of features, which are arbitrarily constrained by the input model size (see Literature Reference Nos. 1-3). They rely on an exhaustively large set of key phrases and 1-shot correlation tests, which can sometimes produce spurious predictors. These models seek to maximize model fit on historic data, but their predictive abilities do not extend to future data of the same type, or to contextually similar data. As a result, human intervention and subjective decisions are required to filter the key phrases used by a particular model.

Even if one can automate the searches using existing models, it is usually not feasible to produce counts for very large feature sets (e.g., every two-word phrase in the English language), and so the initial feature selection step must be relatively aggressive. Relatedly, interacting through a search interface means that there is no simple way to retrieve objects like the set of all words occurring at least 20 times in the corpus of documents, or the inputs to computing term frequency-inverse document frequency (tf-idf) (see Literature Reference No. 9).

Past works generally focused on forecasting economic series pertaining to the United States only due to the availability of economic and social-media data. However recent work has shown that even for rather small economies, the online searches of inhabitants (i.e. Google Trends data) can be successfully utilized for macroeconomic predictions (see Literature Reference No. 3).

Thus, a continuing need exists for a system for learning optimal predictors in forecasting that objectively optimizes the predictor selection strategy within contexts to more effectively construct generalizable models and choose the indicators for accurate prediction.

SUMMARY OF INVENTION

The present disclosure is directed to a system for learning and predicting key phrases. In one aspect, the system includes one or more processors and a memory. The memory is a non-transitory computer-readable medium having executable instructions encoded thereon, such that upon execution of the instructions, the one or more processors perform several operations, such as receiving a dataset having historical forecasting questions, their associated time-series data for a quantity of interest, and associated keyword sets; temporally chunking the dataset into time segments to be used for system training; extracting a context vector from text within the historical forecasting questions; learning an optimal policy of actions to take given the associated keyword sets, extracted context vector, and an external text corpus in order to produce an optimal set of keywords which are predictive of the quantity of interest; and generating a trained value network based on the optimal policy of actions, the trained value network operable for determining an optimal action for any set of keywords pertaining to an individual forecasting problem.

In another aspect, learning the optimal policy of actions is performed using MCTS, a value network, and a policy network.

In yet another aspect, the optimal action includes at least one of expanding, deleting, or modifying keywords in the set of keywords.

Further, the memory also includes instructions for causing the one or more processors to perform operations of extracting a context vector and initial keyword set from a new forecasting question and associated historical time series data; based on the trained value network, performing the optimal actions to perturb the initial keyword set to generate an optimal predictive key-phrase set; retrieving a key-phrase time-series data for the optimal predictive key-phrase set; generating a forecast of future values for a value of interest based on using the key-phrase time series data to fit a BSTS model on the historical time series data; and providing the forecast of future values for display to a system operator or for further processing.

Additionally, in learning the optimal policy of actions to take, a BSTS model implements a reward function to determine a reward for a given optimal action, in which a reward for taking an action is based on a decrease in prediction error of the BSTS model obtained from using the time-series data associated with keywords in the associated keyword set.

In another aspect, the new forecasting question is directed to potential sales of a particular product type. In this aspect, the system is directed to identifying the optimal predictive key-phrase set associated with sales of the particular product type, such that when users on a social media network use words within the optimal predictive key-phrase set, sales of the particular product type are predicted to increase and advertisements for a specific product related to the particular product type are pushed through the internet and caused to be displayed to users of the social media network.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
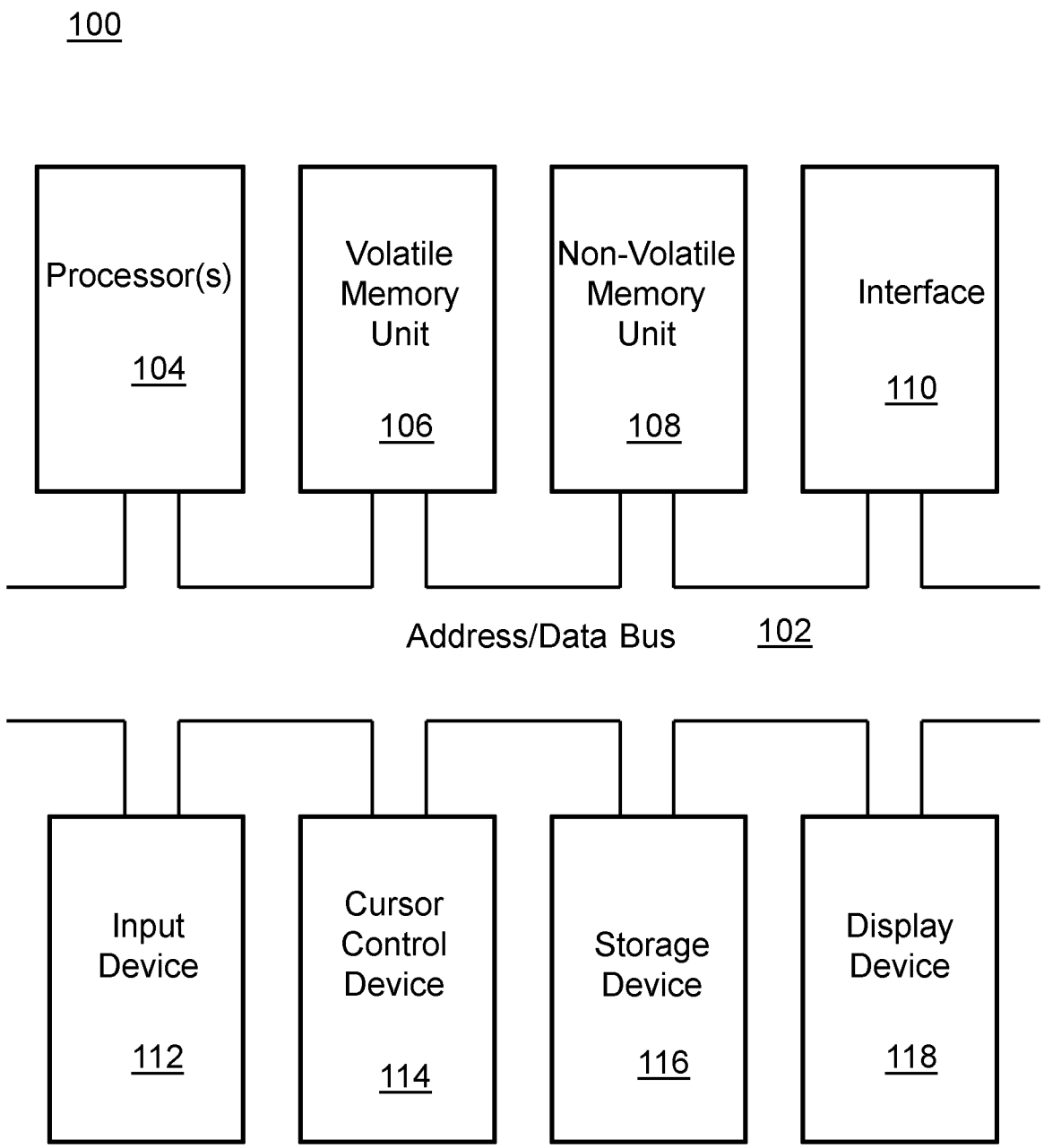
FIG. 1 is a block diagram depicting the components of a system according to various embodiments of the present invention.

The present invention relates to a system for learning key phrases and, more specifically, to a system for selection of optimal predictors in time-series forecasting. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) LIST OF INCORPORATED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. Choi, Hyunyoung, and Hal Varian. "Predicting the present with Google Trends." Economic Record 88 (2012): 2-9.
2. Scott, Steven L., and Hal R. Varian. "Predicting the present with Bayesian structural time series." International Journal of Mathematical Modelling and Numerical Optimisation 5.1-2 (2014): 4-23.
3. Pavlicek, Jaroslav, and Ladislav Kristoufek. "Nowcasting unemployment rates with google searches: Evidence from the visegrad group countries." PloS one 10.5 (2015): e0127084.
4. Scott, Steven L., and Hal R. Varian. "Bayesian variable selection for nowcasting economic time series." Economic analysis of the digital economy. University of Chicago Press, 2015. 119-135.
5. Duygu Balcan et al., Modeling the spatial spread of infectious diseases: The GLobal Epidemic and Mobility computational model, Journal of Computational Science, Volume 1, Issue 3, 2010, Pages 132-145.
6. Dugas A F, Jalalpour M, Gel Y, Levin S, Torcaso F, et al. (2013) Influenza Forecasting with Google Flu Trends. PLOS ONE 8(2): e56176.
7. Ramakrishnan, Naren et al. 'Beating the News' with EMBERS: Forecasting Civil Unrest Using Open Source Indicators Proceedings of the 20th ACM SIGKDD International Conference on Knowledge Discovery and Data Mining, 2014.
8. Compton, Ryan, et al. "Using publicly visible social media to build detailed forecasts of civil unrest." Security informatics 3.1 (2014): 4.
9. Gentzkow, Matthew, Bryan T. Kelly, and Matt Taddy. Text as data. No. w23276. National Bureau of Economic Research, 2017.
10. Kishimoto A and Müller M., From Deep Blue to Monte Carlo: ! An Update on Game Tree Research. In Tutorials for AAAI (2014).
11. Lanctot, M., Winands, M. H. M., Pepels, T. & Sturtevant, N. R., Monte Carlo tree search with heuristic evaluations using implicit minimax backups. In IEEE Conference on Computational Intelligence and Games, 1-8 (2014).
12. Silver, David et al. Mastering the game of Go with deep neural networks and tree search. In Nature volume 529, pages 484-489 (28 Jan. 2016).
13. Diederik P. Kingma and Jimmy Ba, Adam: A Method for Stochastic Optimization. In International Conference on Learning Representations (2015).
14. SpaCy Python Library, found at https://spacy.io/, taken 2018.

(2) PRINCIPAL ASPECTS

Various embodiments of the invention include three "principal" aspects. The first is a system for learning predictive key phrases. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM ("EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
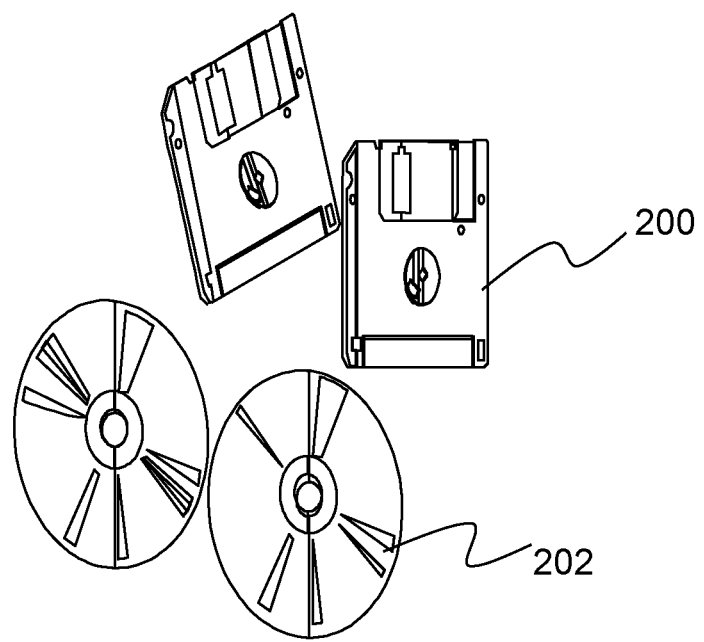
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

The present disclosure provides a Reinforcement Learning (RL) based system for selection of optimal predictors in time-series forecasting. Time-series forecasting is a technique utilized by analysts and decision-makers to gain insight about values of interest using available information. As a result, such analysts need to construct accurate predictive models that project the value of interest. The first step to this process is identifying available indicators that can be utilized for their predictive powers. This requires a tremendous amount of domain knowledge and experience to find an optimal set of indicators. The methodology of the present disclosure outlines a context-aware approach to optimally choosing forecasting indicators from an initial set, by taking advantage of previously successful forecasting models.

A unique aspect of the present approach lies in the formulation of this problem as a learning problem with a well-defined reward structure rooted in the prediction error, and model size necessary to achieve accurate predictions. Specifically, motivating the formulation is the desire to efficiently search for key phrases which can then be used to query open-source data to generate predictive time-series. For example, Bayesian Structure Time-Series (BSTS) Models have been shown to effectively forecast economic indicators such as unemployment (see Literature Reference Nos. 1-4), disease spread (see Literature Reference Nos. 5-6), and occurrences of civil unrest (see Literature Reference Nos. 7-8) with key phrase trend data from search engines and social media, but finding these key phrases traditionally requires expert domain knowledge, and they are often not directly reusable in subsequent forecasting questions with similar or related topics. The RL approach as provided by the present disclosure simulates the process of including, discarding, and expanding key-phrases on example forecasts then leverages this experience to learn an iteration strategy which will enable the system to start with a naïve or random set of keywords which it can perturb to an optimal set; thus overcoming the "cold-start problem" for new forecasting questions. The strategy is conditional on contextual awareness, and as such can be used to identify globally optimal key phrases that are broadly related to semantic contexts rather than specific quantities of interest. In particular, instead of saturating the model with potential indicators and then arbitrarily defining the model size, the RL formulation of the present disclosure allows the system to take advantage of known priors on the desired forecast and reuse information embedded in the question presented (e.g. countries of interest, topics).

Further, current time-series forecasting models have focused on using a large set of features, which are arbitrarily constrained by the input model size (see Literature Reference Nos. 1-3). Existing models rely on an exhaustively large set of key phrases and 1-shot correlation tests, which can sometimes produce spurious predictors. Such models seek to maximize model fit on historic data, but their predictive abilities do not extend to future data of the same type, or to contextually similar data. As a result and as noted above, human intervention and subjective decisions are required to filter the key phrases used by a particular model. By learning these relationships, the system of the present disclosure relieves the costs associated with the human intervention and rule construction, as well as sheds light on otherwise missed relationships overlooked by people.

Past work has relied solely on practitioners utilizing domain knowledge and arbitrary decisions to determine good indicators for the data. Subsequently, existing models are typically over-parameterized and constrained by experts to a smaller set using subjectively determined model size and the computation of "inclusion" scores on indicators. The methods as provided by the present disclosure would allow for the utilization of existing natural language processing tools (NLP) to stream-line the process, by constructing a "naïve" set of words and a context representation which can be perturbed into the optimal set of predictors and thusly the optimal model size. Furthermore, once trained, the policy and value functions learned by the RL system cut down the size of the BSTS models (and consequently the computational resources) as compared to the previous works, which uses the top 100 words as extracted from Google Correlate (see Literature Reference No. 2).

Before describing the system in detail, provided below is a description of a platform that can be used to provides inputs to the system. Specifically, the present invention was tested using the MATRICS system, which is an online platform built for hybrid forecasting (as referenced above). The MATRICS system was described in U.S. Provisional Application No. 62/815,304, filed on Mar. 7, 2019, the entirety of which is hereby incorporated by reference. The purpose of the MATRICS system is to develop and test hybrid human-machine geopolitical forecasting systems and identify approaches that radically improve the accuracy and timeliness of geopolitical forecasts. Forecasting questions fall under several general categories such as politics, natural science, and health/disease, with time-series prediction being the most useful for economics related questions.

Figure 3:
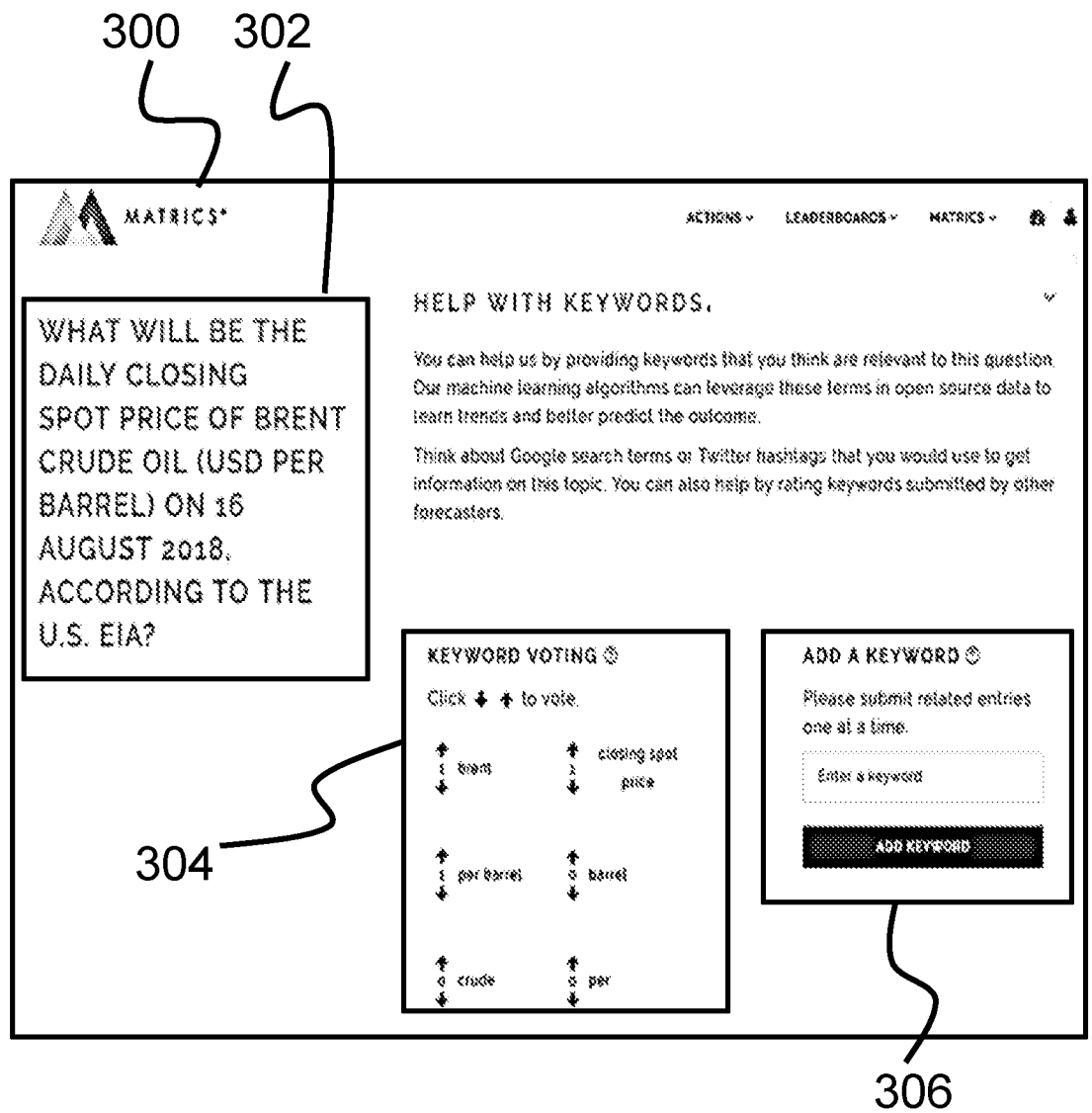
FIG. 3 is an illustration of a screenshot from a MATRICS website, depicting Keyword voting where users vote on both machine and user generated key-phrases.
Figure 4A:
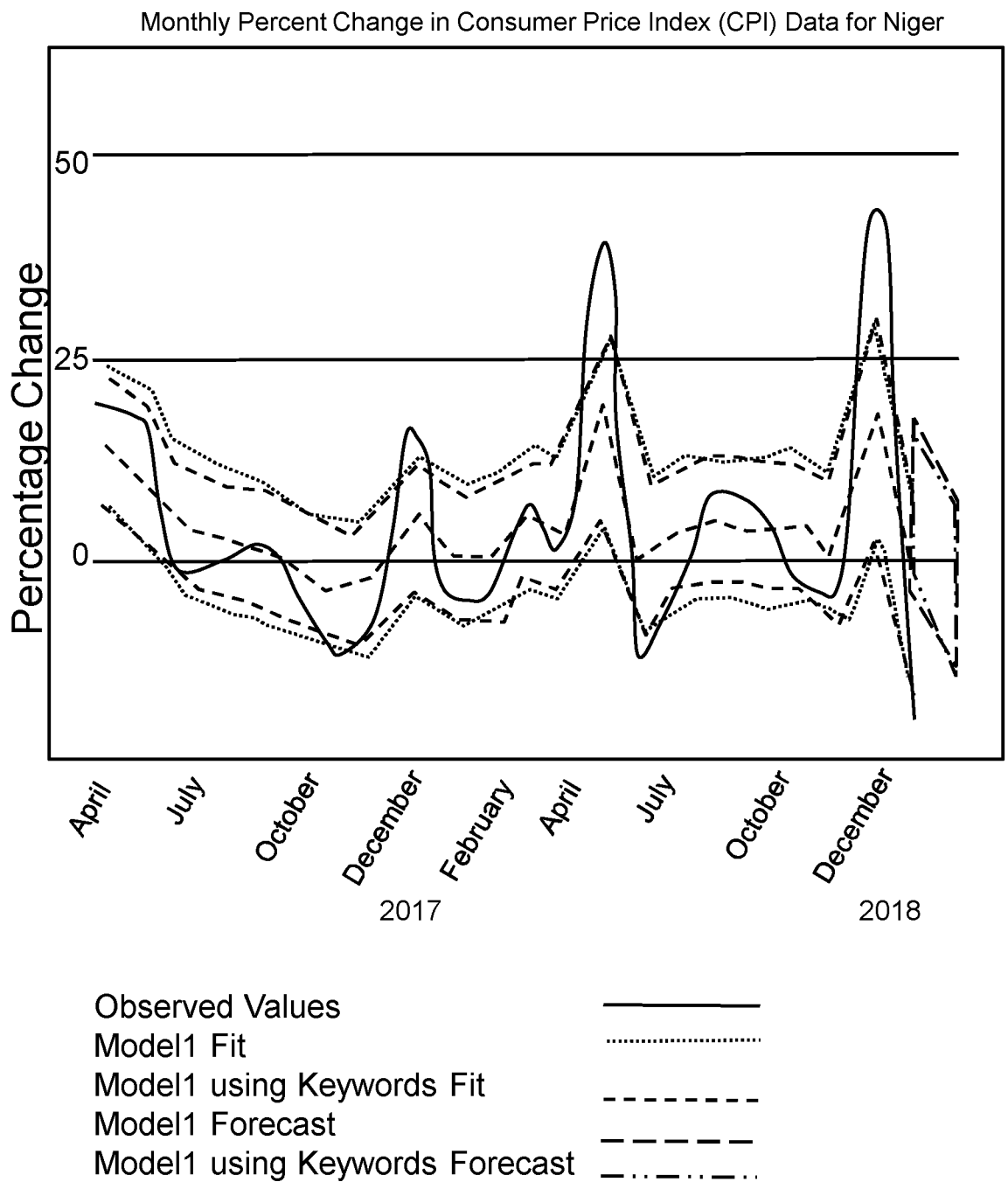
FIG. 4A is a chart depicting a percent change in consumer price index (CPI) and corresponding machine generated forecasts with and without using the Google Trends data for the top three keywords according to various embodiments of the present invention.
Figure 4B:
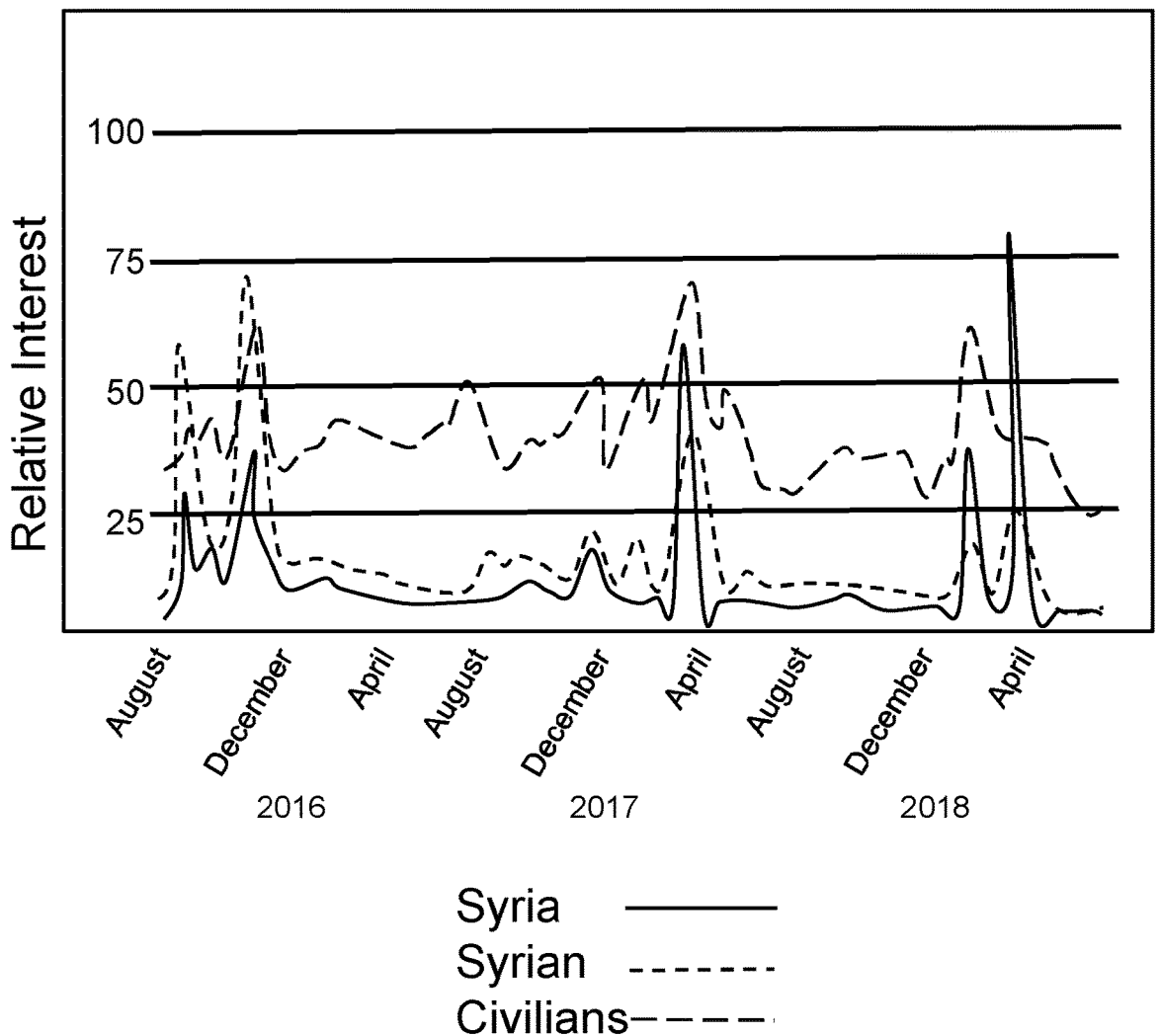
FIG. 4B is a chart depicting Google Trends time-series plots for the three most updated keywords according to various embodiments of the present invention.

Within the MATRICS system, more than one thousand users have the ability to submit and vote on keywords pertaining to each Individual Forecasting Problem (IFP). An example of such a MATRICS interface 300 is shown in FIG. 3, which depicts an example IFP 302 and a keyword voting box 304 that allows users to vote on the relevant keywords. Also depicted is a keyword suggestion box 306 where a user can upload or otherwise suggest a keyword for voting. Thus, within the MATRICS system, users have the ability to submit and vote on keywords pertaining to each IFP 302. The top 3 up-voted keywords are then used to extract Google Trends time-series, which are used as regression predictors for the quantity of interest. The example results are depicted in FIGS. 4A and 4B. FIG. 4A shows the monthly percent change in consumer price index (CPI) 400 for Niger and corresponding machine generated forecasts with and without using the Google Trends data for the top 3 keywords. The model generate values are compared to the observed (actual) values. The Google Trends time-series plots for the three most updated keywords (across all teams on the MATRICS system) are shown in element 401 of FIG. 4B. In the first year of using the MATRICS system, neither the keywords generated by an automated keyword extractor nor by the human participants were very predictive, leading to the necessity of the system of the present disclosure. FIG. 4B is a plot of the Google Trends time-series (i.e., proportion of Google searches which contained these keywords at each time point). There is one line per keyword, coded as shown in the legend. These time-series are fed into the model used for prediction in FIG. 4A "Model 1 using Keywords Fit".

The present methodology presents a context-aware approach to optimally choosing forecasting indicators from an initial set. The system them proceeds to provide the forecasting indicators to system operators and/or other systems for further processing and use. As can be appreciated by those skilled in the art, there are several applications in which the present invention can be implemented. Specific details are provided below.

(4) SPECIFIC DETAILS OF VARIOUS EMBODIMENTS

Figure 5:
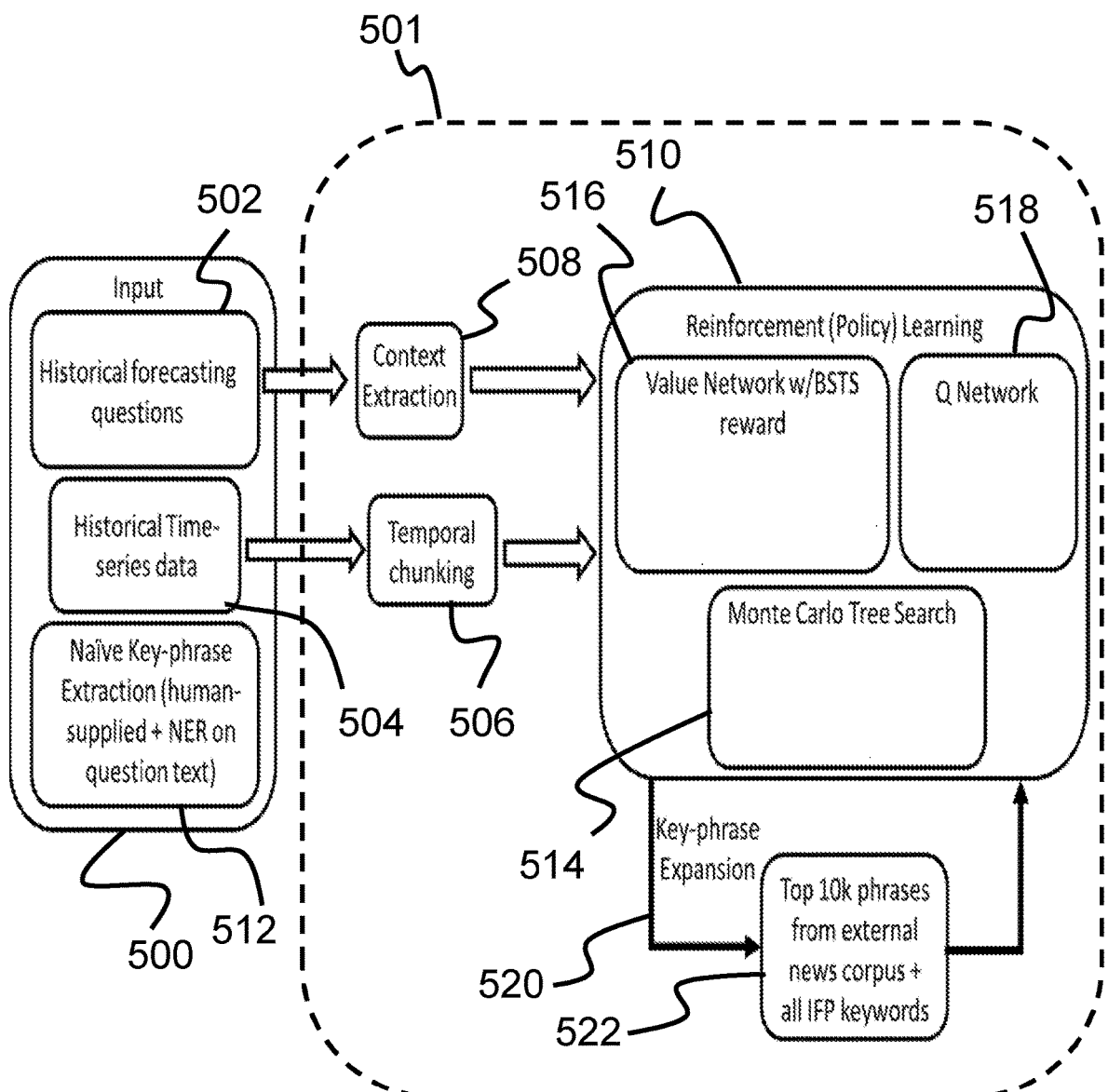
FIG. 5 is a flowchart depicting a training system which receives as input historical forecast data according to various embodiments of the present invention.
Figure 6:
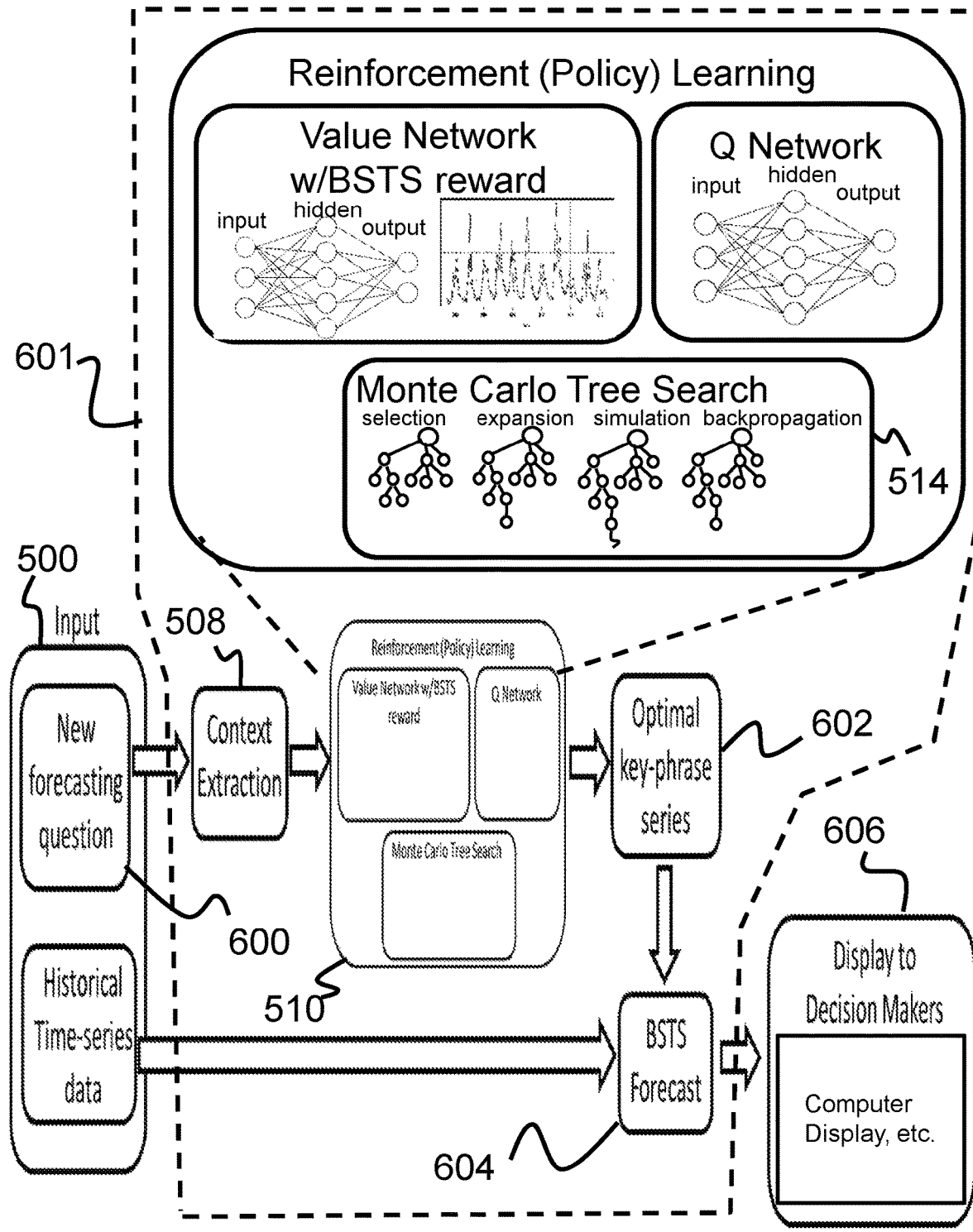
FIG. 6 is a flowchart depicting a test system according to various embodiments of the present invention.

As noted above, the present disclosure provides a reinforcement learning (RL) based system for selection of optimal predictors (such as key phrases) in time-series forecasting. The system of the present disclosure includes at least two processing flow pipelines, a training system (as shown in FIG. 5) and a prediction system (as shown in FIG. 6). The boxes labeled "Input" 500 come from the MATRICS system referenced above, however in practice this information can come from any other source. Referring to the training system 501 as shown in FIG. 5, in MATRICS, a historical forecasting question 502 provided by the intelligence community is automatically parsed and assigned to 1 of N "canonical categories" for which historical data is available. The forecasting question 502 is also automatically parsed for key-phrases, entities, and values using any suitable parser, an example of which includes a parser in conjunction with SpaCy's named entity-extraction (see Literature Reference No. 14). This set of key-phrases is expanded 512 by those provided by users of the MATRICS system. The system collects open source trend data for the key-phrases from sources like Google and Twitter, etc. The historical time-series data 504 associated with the "canonical categories" is then accessed from a database which stores previously scraped open source values. The historical time-series data 504 is used as the value of interest and the key-phrase trend data is used as the input into the present system. This is explicitly represented in the system by way of a context vector, which is extracted (via context extraction 508) from the question 502 text, and the historical time-series data 504 is chunked (via temporal chunking 506) into smaller windows in order to increase the size of the training set. The reason for temporal chunking 506 is to increase the size of the training set. Imagine that there is a historical time-series of data, and a user desires to use the historical time-series of data to train a prediction model. The "chunks" of time that one would train the system on should correspond approximately to the time horizon for the forecasts that are expected to be provided by the system. For example, if one was interested in training a system to predict a company's earnings for the next financial quarter, the user might train the system with chunks containing several years of data at a quarterly time-resolution.

The context extraction 508 and reinforcement learning (RL) system 510 are described in further detail in the following sections.

(4.1) Context Extraction

Context extraction 508 is the process of representing a specific forecasting problem as a combination of known factors found within it. For example, in forecasting the weather, geographic location and the time of the year are a context that influence which indicators are informative for the prediction of temperature and humidity. This allows the system to generalize insights gained about other regions and times of the years to previously unseen region/time-of-year combinations.

For the purposes of the MATRICS system, context can be a representation of known entities in the system. Presently the system utilized by the training system 501 parses incoming questions, identifying entities such as geographic names (e.g. countries, oceans, regions), and economic values (e.g. stock indices). The system 501 also categorizes the question into a more general topical category, and determines whether the question follows a predetermined template for which specific data are collected. Finally, the training system 501 also identifies the temporal window for which the prediction is being made.

The extracted categorical values all share information that is relevant to the task of forecasting the resolution to these questions. The system accepts these contexts as input along with a set of key-phrases and determines whether the signals associated with the key-phrases are likely to be predictive. The categories thus can be implemented as part of an embedding layer that is passed into the requisite neural networks that are trained in the learning system described below.

(4.2) Learning System:

The reinforcement learning (RL) system 510 utilizes the value gained from expanding on a key-phrase or removing it from the set. In this context, the value or value network 516 is measured by taking the Bayesian structural time series (BSTS) model using a previous set of keywords and comparing its BSTS error to the error produced by a new set of keywords. Additional details regarding the RL system 510 are provided below.

(4.3) Monte Carlo Tree Search

The RL system 510 makes decisions on which words are expanded, kept, or deleted. Exhaustively searching all combinations for optimal choices of actions over the set of keywords is intractable, so a pseudo-random search algorithm—Monte Carlo Tree Search 514 (see Literature Reference No. 11) is used. The Monte Carlo Tree Search (MCTS) 514 is a stochastic sampling method that simulates the decision-making process until it has converged on a final state, or until maximum look-ahead depth has been reached. The maximum look-ahead depth refers to a predefined number of steps that will be simulated before exiting. Representing the decision to expand, keep, or delete as an action and a current set of key-phrases as the state of the system, the MCTS 514 process samples greedily over state-action pairs, then stochastically chooses to explore new actions. By running multiple MCTS 514 iterations, the RL system 510 collects approximate reward value over the actions associated with a current state.

The sampled actions and consequential rewards are used to train 2 neural networks: a value network that associates the (state, context) pair with the projected reward, and a policy network that associates the (state, context, action) triple with the projected reward. The value network learns how to evaluate whether or not a given set of key-phrases is a good set for the given context, and the policy network learns to determine whether a specific perturbation of the key-phrases (adding/deleting phrases) will affect the over-all performance of the system.

Exhaustively searching the space of all possible inclusions for a given model is an exponentially growing problem as the set of possible indicators grows. Instead and as noted above, a pseudo-random heuristic approach to searching is implemented. The MCTS 514 process simulates iterations and evaluates the value of each set of indicators, evaluating a heuristic function to estimate the value of a non-terminal state, and the true reward for terminal states. While running simulations, the MCTS 514 collects value statistics for explored future states, then these statistics are used to execute an action (see Literature Reference No. 11). Examples of such actions include a decision to expand, keep or delete a key-phrase.

Previous implementations of tree-searches including MCTS required expert knowledge and hand-crafted heuristic functions, to expedite the search through the states of the tree (see Literature Reference No. 10). The approach as provided by the present disclosure utilizes the reformulation of the search problem as a state-action learning problem, optimizes the Mean Squared Error (MSE) of the BSTS model prediction. This allows the RL system 510 to iteratively fit function approximators (specifically neural networks) which learn heuristic values from the value data generated by the MCTS 514 simulations.

During training, if a simulation reaches a terminal state, it will be processed with a true reward function. In reinforcement learning, a reward function is something that the algorithm seeks to maximize, through a sequence of actions. In this case, the reward for taking an action (e.g., deleting a key-phrase from the set) is based on the change in prediction error of the BSTS model using the Google Trends time-series data corresponding to the set of key-phrases with and without that deleted key-phrase. During run time an approximation function (in this case a neural network 518) is used. The values are then back-propagated over the decisions made during that specific simulation and the next simulation begins, now with a prior bias based on the previously explored action-state pairs. The priors associated with the actions for a given state are used as a distribution for sampling actions during the simulation. The goal of the reinforcement learning is to learn what the "optimal" (reward maximizing) actions are for a given "state" (current set of keywords). The prior captures this information by associating each action in a given state with its likelihood to produce a reward. This information can be used as a distribution to sample/select optimal actions.

As shown in FIG. 5, if/when the system chooses the action "expand" 520 to expand the set of key-phrases, the system uses a set of words 522 that it can choose to expand the set with. This set of words 522, in the example as written in the box, comes from the top 10,000 phrases from an external news corpus+all the keywords from all previously seen IFPs.

(4.4) Neural Networks for State-Context Value Approximation

Figure 7:
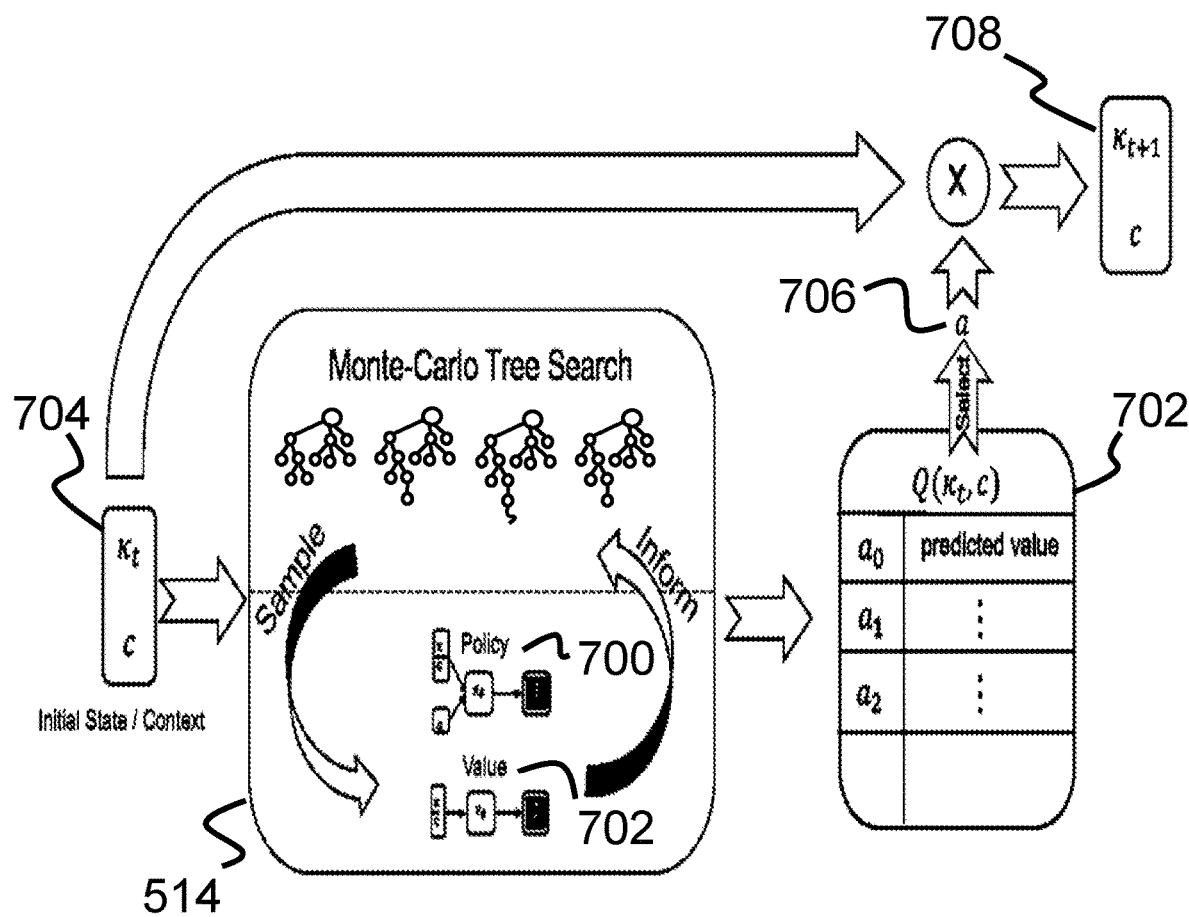
FIG. 7 is a flowchart depicting an action selection processing using Monte Carlo Tree Search (MCTS) and Neural Networks according to various embodiments of the present invention.

Computing the BSTS model MSE for each new IFP and context requires frequently recalculating the values. Time costs can be addressed by pre-processing the values of states for each context; however, this explodes in memory very rapidly and still requires a tremendous amount of redundancy. Instead and as shown in FIG. 7 (note that FIG. 7 provides further details as to what happens in the "Reinforcement (Policy) Learning" box 510 of FIGS. 5 and 6), the system proceeds by learning 2 function approximations (Eqs. 1-2 below), parameterized by $\theta$ and $\phi$ respectively, as follows:

$$\pi(\kappa, c, a | \theta) \approx \rho((\kappa \times a), c) \qquad \text{Eq. 1}$$

$$v(\kappa, c | \phi) \approx \rho(k, c) \qquad \text{Eq. 2}$$

Equation 1 is implemented for a "policy network" 700 and evaluates the expected future reward of taking an action a 706 given state-context pair ($\kappa$, c). Further, Equation 2 is implemented for a "value network" 702 and evaluates the expected reward given state-context pair ($\kappa$, c). One function approximates long-term reward ($\rho$) of the current set of indicators ($\kappa$), while the other predicts the value of adding new, or removing indicators from the set. The general training procedure of MCTS as combined with the value network 702 and the policy network 700 is described in Literature Reference No. 12. It should be noted that while MCTS is prior art, its use as applied in the present invention, including the defined space of actions, states, input/output etc. is unique, as is the concept of "expansion" of the keyword set from an alternate general text corpus, and the usage of the BSTS model to compute a reward based on prediction accuracy.

The values are recorded in a state-action look-up table 702 which represents the approximate long-term reward of taking a specific action given a state 704. During the training iterations, this is used a distribution from which actions are sampled in order to encourage exploration and avoid early convergence on sub-optimal policies. The selected (sampled) action is the action "a" 706 coming out of the look-up table 702, and the consequent state is ($k^{t+1}$, c) 708.

(4.5) Combining MCTS with Neural Networks (NNs)

The training process performs the MCTS 514 process by collecting statistics on the action space.

During the iterations:
1. If the current state (set of indicators) are terminal T it is evaluated using the reward function, which is then back-propagated.
2. If the state being explored has not been visited before, and is not terminal, priors on the actions in that state are computed using the current policy network, and the current state is evaluated using the value network to predict its "down-stream" reward.
3. Otherwise, the down-stream value (Q(κ, c, a)) is explicitly approximated (using Algorithm 1 below) and the best (a=argmax$_{\forall_a}$Q(κ, c, a')) is chosen and a recursive search is performed on (κ×a).

Algorithm 1 is provided as follows:

---

Algorithm 1
Training Monte Carlo Tree Search; search($κ_t$, $κ_{t-1}$, $κ_i$, c, E, Q, P, N)

if τ($κ_t$, $κ_{t-1}$) then
  return ρ($κ_t$|c, $κ_i$)
else if $κ_t \notin$ E then ▷ if this state has previously not been explored by the MCTS search
  P($κ_t$, $a_i'$) ← $π_i$beta(κ, c, $a_i'$)∀$a_i'$ in $\mathcal{A}$($κ_t$, ▷ Computing the prior beliefs of value per action
  E ← E ∪ $κ_t$
  return ρ($κ_t$|c, $κ_i$) ▷ Since the default is to terminate we can simply return the reward
else    ▷ If we have visited this state before and it is not terminal
  $\hat{Q}$ ← −∞, $\hat{A}$ ← ∅
  for $a_i' \in \mathcal{A}(κ_t)$ do
    u ← P($κ_t$, $a_i'$)

$$u \leftarrow u \times \sqrt{\frac{\sum_{\forall κ_j \in A(κ_t)} N(κ_t, a_i)}{N(κ_t, a_i')}}$$

if Q($κ_t$, $a_i'$) + u > $\hat{Q}$ then
      $\hat{Q}$ ← Q($κ_t$, $a_i'$) + u
      $\hat{A}$ ← {$a_i'$}
    else if Q($κ_t$, $a_i'$) + u = $\hat{Q}$ then
      $\hat{A}$ ← $\hat{A}$ ∪ {$a_i'$}
    end if
  end for
  $a_i' \sim \hat{A}$
  $κ_{t+1}' \leftarrow κ_i \times a_i'$
  η ← search($κ_{t+1}'$, $κ_t$, $κ_i$, c, E, Q, P, N)   ▷ Recursive search call $$Q(κ_t, a_i') \leftarrow \frac{(N(κ_t, a_i') * Q(κ_t, a_i')) + η}{N(κ_t, a_i') + 1}$$

N($κ_t$, $a_i'$) ← N($κ_t$, $a_i'$) + 1
  return η
end if

---

For further understanding, the "if", "else if", and "else", which are the farthest left justified in Algorithm 1, correspond to the numbers 1, 2, and 3 in the Iteration steps listed above. The update for Q is provided in the "else" step, which updates Q($k_t$, $a_i'$). The general training procedure of MCTS as combined with the value network 702 and the policy network 700 is described in Literature Reference No. 12. It should be noted that while MCTS is prior art, its use as applied in the present invention, including the defined space of actions, states, input/output etc. is unique, as is the "expansion" of the keyword set from an alternate general text corpus and the usage of the BSTS model to compute a reward based on prediction accuracy. This modified use of the MCTS algorithm learns Q, the optimal mapping (policy) between the current state to the subsequent action.

After all of the iterations have been computed, Q(κ, c, •) is computed and then an action is sampled from the distribution D=softmax(Q(κ, c, •)), where • denotes "over all actions a". This is used to collect training examples, until a terminal state is reached. Afterwards, the parameters θ and φ are updated by evaluating the true final long-term reward using the stochastic gradient method ADAM (see Literature Reference No. 13).

During testing and as shown in FIG. 6, the MCTS 514 process is performed the same way to collect the Q-value statistics over the action space; however, the process only uses the value network v and does not explicitly compute the reward. Then, instead of randomly sampling an action, the action with the maximum Q-value is chosen. An action is one of (expand, delete, . . . ) for the current keyword set, as described above. Instead of randomly sampling an action to explore the space of actions as in training, the testing system chooses the optimal action provided by the value network, which is faster than explicitly computing the reward using BSTS, but should still correspond to the optimal action calculated using the explicit reward computation. These changes also make the testing decision much faster than the training process.

Also as shown in FIG. 6, if given a new forecasting question 600, along with an automatically extracted context vector (via context extraction 508), the RL system 510 is able to generate a set of optimally predictive key-phrases 602 (i.e., most predictive word set) for testing the regression predictors. The optimal set of predictive key-phrases 602 are identified as described above with respect to the testing procedure. More specifically, the testing system 601 includes a BSTS forecast module 604. The BSTS forecast module 604 fits a BSTS model on historical time-series data using the Google Trends time-series values for the predictive word set 602 as regression inputs. The fitted BSTS model is used to forecast future values of the time-series of interest (e.g. oil price, or consumer price index) and that forecast is then displayed 606 to an operator or otherwise provided to other systems and operations for further processing.

(4.6) Experimental Dataset

A small sample of test experiments were conducted in order to verify that model fit improvement could be soundly used as a reward function in reinforcement learning. Five predetermined signals were used to represent trend data. These signals will be the signals regressed on by the BSTS model. The signals include: constant, linear, squared polynomial curve, a sinusoid with no frequency adjustment, and a sinusoid with 10$x$ frequency. For four contexts, the input signals were linearly combined using randomly chosen weights to construct value signals with the injection of Gaussian white noise and represented using a one-vector for context. A final context was constructed which was nothing but the constant signal, in which case the inclusion of any signals other than the constant input would hurt the performance of the system.

A state vector represented the inclusion of an input signal into a BSTS model fit and actions represented the expansion, inclusion, and removal of words to the state. The expansion of the input signal followed a predetermined graph of relations. The objective was to learn the optimal set of expansions, and deletions from a given state for each context.

The system was trained using across epochs of simulating numerous episodes where the system was initialized to a random initial condition. Then, during each step of the iteration, the agent ran a number of MCTS iterations, collecting value statistics across the current states' action space, and then it would randomly sample from the actions where the probability of an action was correlated to its computed value. After several episodes were run using the current iteration of the neural networks, the parameters for the neural networks were updated using the rewards collected over the episodes.

At the end of a training epoch, the system was evaluated for performance in each of the five constructed contexts. During evaluation the system was initialized with the same initial condition: a single signal included that was constant.

This experiment resembles the process by which keywords and their corresponding trend data can be used to predict the desired forecast. The error on the fit of the BSTS model and the size of the model all effect the performance of the size. The demonstrated contexts are analogous to having an economic indicator that one is interested in predicting using a set of available key-phrases and their respective trend data. Traditionally, one would fit the model with all of the available key-phrases; however, for many non-linear signals (mostly sporadic ones) one would potentially select erroneous signals that are not informative in the true nature of the desired indicator. The present approach allows system operators to be more selective with the inputs because the input selection process is generalized to an observed context rather than a specific forecast. Furthermore, by penalizing with respect to the model size, the learned system will only add new input signals if the improvement in the forecast for the context outweighs the cost of the inclusion.

Figure 8:
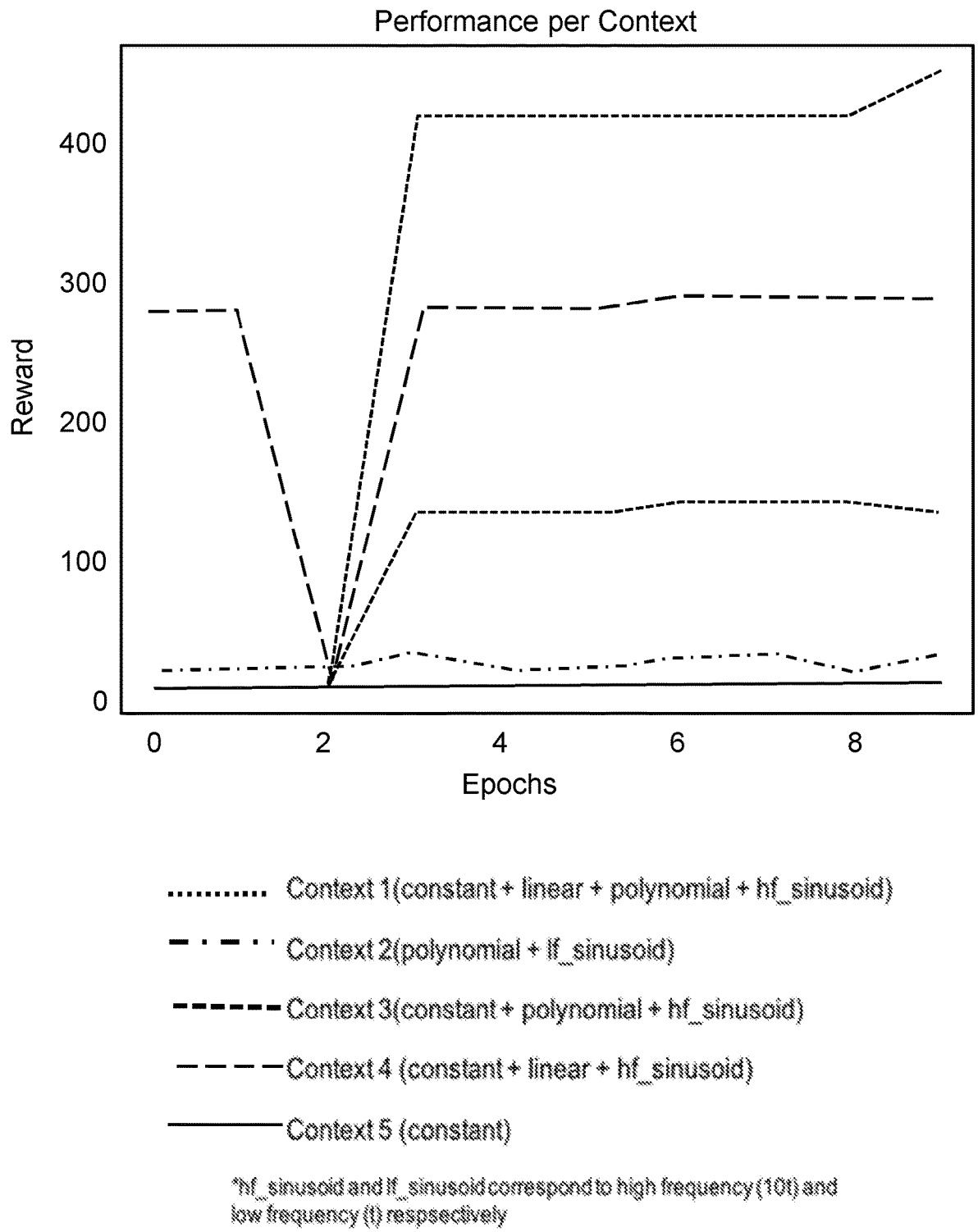
FIG. 8 is chart depicting a learning curve that represents error of the system per epoch of training.

FIG. 8 shows the performance per context per training epoch for the system and demonstrates their respective learning curves. It can be observed that even though the initial conditions are initially good for a single context, and that it seems that the system is forgetting, in the next epoch the learning weights are updated adequately to improve the final state performance. Importantly, the system's score also learns not to perform any actions for the constant output context as observed by the 0 score for that case. These results are indicative that model fit improvement could be soundly used as a reward function in reinforcement learning.

(4.7) Example Implementations

As can be appreciated by those skilled in the art, there are several practical applications in which the system and method described herein can be implemented. For example, machine-aided forecasting provides an informative decision-aid for government policy makers and analysts, allowing for improvements in speed and accuracy of time-series forecasting. Other applications include sales and marketing, i.e. predicting sales and other financial/economic time-series data, customer interest, and population reach of an advertising campaign.

The optimal keyword set that this system produces must be tied to a forecast of some type, since whether or not they are predictive of a time-series of interest (i.e. oil prices etc.) is what is used to determine the reward function and therefore when they are "optimal". One example application is in which an operator is trying to forecast the quantity of a particular product that a person or user will buy based on the keywords they use. Another action based on a forecast quantity could be any automated purchasing, such as an automated stock trader, grocery order, etc.

Figure 9:
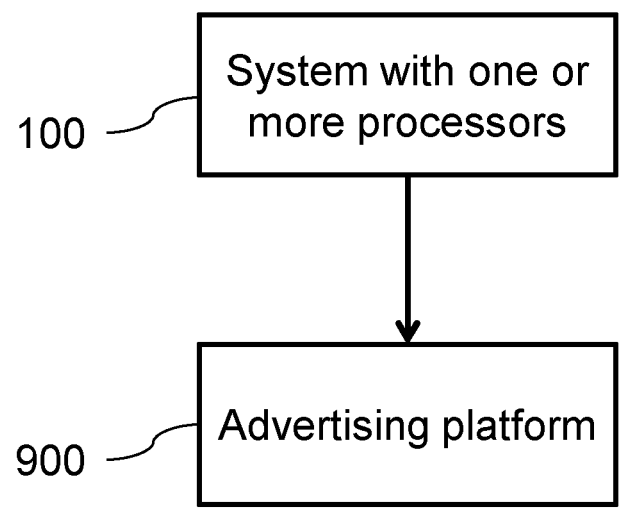
FIG. 9 is a block diagram depicting control of an advertising platform according to various embodiments.

As shown in FIG. 9, the system 100 may be used to control an advertising platform 900 that generates and pushes advertisements to the relevant parties. For example, if the system 100 determines that a set of predictive keywords are indicative of an interest in a particular product type, then the system 100 can cause the advertising platform 900 to push advertisements through the internet for display on user devices (screens, etc.) to those users who have used the predictive keywords. For example, the system 100 can interface with a social media network (e.g., Facebook®, Twitter®, etc.) that operates as an advertising platform 900. When users on the social media network use the relevant predictive keywords, the system 100 causes the advertising platform to display on the user's accounts advertisements for specific products that are related to the particular product type.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for learning and predicting key phrases, the system comprising:
   one or more processors and a memory, the memory being a non-transitory computer-readable medium having executable instructions encoded thereon, such that upon execution of the instructions, the one or more processors perform operations of:
      receiving a dataset having historical forecasting questions, their associated time-series data for a quantity of interest, and associated keyword sets;
      temporally chunking the dataset into time segments to be used for system training;
      extracting a context vector from text within the historical forecasting questions;
      learning an optimal policy of actions to take given the associated keyword sets, extracted context vector, and an external text corpus in order to produce an optimal set of keywords which are predictive of the quantity of interest;
      generating a trained value network based on the optimal policy of actions, the trained value network operable for determining an optimal action for any set of keywords pertaining to an individual forecasting problem;
      extracting a context vector and initial keyword set from a new forecasting question and associated historical time series data;
      based on the trained value network, performing the optimal actions to perturb the initial keyword set to generate an optimal predictive key-phrase set;
      wherein the new forecasting question is directed to potential sales of a particular product type, and the system is directed to identifying the optimal predictive key-phrase set associated with sales of the particular product type, such that when users on a social media network use words within the optimal predictive key-phrase set, sales of the particular product type are predicted to increase; and pushing advertisements for a specific product related to the particular product type through the internet and causing the advertisements to be displayed to users of the social media network.

2. The system as set forth in claim 1, wherein learning the optimal policy of actions is performed using a Monte Carlo Tree Search, a value network, and a policy network.

3. The system as set forth in claim 2, wherein the optimal action includes at least one of expanding, deleting, or modifying keywords in the set of keywords.

4. The system as set forth in claim 3, further comprising operations of:
    retrieving a key-phrase time-series data for the optimal predictive key-phrase set;
    generating a forecast of future values for a value of interest based on using the key-phrase time series data to fit a Bayesian Structure Time-Series model on the historical time series data; and
    providing the forecast of future values for display to a system operator or for further processing.

5. The system as set forth in claim 4, wherein in learning the optimal policy of actions to take, a Bayesian Structure Time-Series model implements a reward function to determine a reward for a given optimal action, in which a reward for taking an action is based on a decrease in prediction error of the Bayesian Structure Time-Series model obtained from using the time-series data associated with keywords in the associated keyword set.

6. The system as set forth in claim 1, further comprising operations of:
    retrieving a key-phrase time-series data for the optimal predictive key-phrase set;
    generating a forecast of future values for a value of interest based on using the key-phrase time series data to fit a Bayesian Structure Time-Series model on the historical time series data; and
    providing the forecast of future values for display to a system operator or for further processing.

7. The system as set forth in claim 1, wherein the optimal action includes at least one of expanding, deleting, or modifying keywords in the set of keywords.

8. The system as set forth in claim 1, wherein in learning the optimal policy of actions to take, a Bayesian Structure Time-Series model implements a reward function to determine a reward for a given optimal action, in which a reward for taking an action is based on a decrease in prediction error of the Bayesian Structure Time-Series model obtained from using the time-series data associated with keywords in the associated keyword set.

9. A computer program product for learning and predicting key phrases, the computer program product comprising:
    a non-transitory computer-readable medium having executable instructions encoded thereon, such that upon execution of the instructions by one or more processors, the one or more processors perform operations of:
    receiving a dataset having historical forecasting questions, their associated time-series data for a quantity of interest, and associated keyword sets;
    temporally chunking the dataset into time segments to be used for system training;
    extracting a context vector from text within the historical forecasting questions;
    learning an optimal policy of actions to take given the associated keyword sets, extracted context vector, and an external text corpus in order to produce an optimal set of keywords which are predictive of the quantity of interest;
    generating a trained value network based on the optimal policy of actions, the trained value network operable for determining an optimal action for any set of keywords pertaining to an individual forecasting problem;
    extracting a context vector and initial keyword set from a new forecasting question and associated historical time series data;
    based on the trained value network, performing the optimal actions to perturb the initial keyword set to generate an optimal predictive key-phrase set;
    wherein the new forecasting question is directed to potential sales of a particular product type, and the system is directed to identifying the optimal predictive key-phrase set associated with sales of the particular product type, such that when users on a social media network use words within the optimal predictive key-phrase set, sales of the particular product type are predicted to increase; and
    pushing advertisements for a specific product related to the particular product type through the internet and causing the advertisements to be displayed to users of the social media network.

10. The computer program product as set forth in claim 9, further comprising operations of:
    retrieving a key-phrase time-series data for the optimal predictive key-phrase set;
    generating a forecast of future values for a value of interest based on using the key-phrase time series data to fit a Bayesian Structure Time-Series model on the historical time series data; and
    providing the forecast of future values for display to a system operator or for further processing.

11. The computer program product as set forth in claim 9, wherein learning the optimal policy of actions is performed using a Monte Carlo Tree Search, a value network, and a policy network.

12. The computer program product as set forth in claim 9, wherein the optimal action includes at least one of expanding, deleting, or modifying keywords in the set of keywords.

13. The computer program product as set forth in claim 9, wherein in learning the optimal policy of actions to take, a Bayesian Structure Time-Series model implements a reward function to determine a reward for a given optimal action, in which a reward for taking an action is based on a decrease in prediction error of the Bayesian Structure Time-Series model obtained from using the time-series data associated with keywords in the associated keyword set.

14. A computer implemented method for learning and predicting key phrases, the method comprising an act of:
    causing one or more processors to execute instructions encoded on a non-transitory computer-readable medium, such that upon execution, the one or more processors perform operations of:
    receiving a dataset having historical forecasting questions, their associated time-series data for a quantity of interest, and associated keyword sets;
    temporally chunking the dataset into time segments to be used for system training;
    extracting a context vector from text within the historical forecasting questions;
    learning an optimal policy of actions to take given the associated keyword sets, extracted context vector, and an external text corpus in order to produce an optimal set of keywords which are predictive of the quantity of interest;

generating a trained value network based on the optimal policy of actions, the trained value network operable for determining an optimal action for any set of keywords pertaining to an individual forecasting problem;

extracting a context vector and initial keyword set from a new forecasting question and associated historical time series data;

based on the trained value network, performing the optimal actions to perturb the initial keyword set to generate an optimal predictive key-phrase set;

wherein the new forecasting question is directed to potential sales of a particular product type, and the system is directed to identifying the optimal predictive key-phrase set associated with sales of the particular product type, such that when users on a social media network use words within the optimal predictive key-phrase set, sales of the particular product type are predicted to increase; and pushing advertisements for a specific product related to the particular product type through the internet and causing the advertisements to be displayed to users of the social media network.

15. The method as set forth in claim 14, further comprising operations of:

retrieving a key-phrase time-series data for the optimal predictive key-phrase set;

generating a forecast of future values for a value of interest based on using the key-phrase time series data to fit a Bayesian Structure Time-Series model on the historical time series data; and providing the forecast of future values for display to a system operator or for further processing.

16. The method as set forth in claim 14, wherein learning the optimal policy of actions is performed using a Monte Carlo Tree Search, a value network, and a policy network.

17. The method as set forth in claim 14, wherein the optimal action includes at least one of expanding, deleting, or modifying keywords in the set of keywords.

18. The method as set forth in claim 14, wherein in learning the optimal policy of actions to take, a Bayesian Structure Time-Series model implements a reward function to determine a reward for a given optimal action, in which a reward for taking an action is based on a decrease in prediction error of the Bayesian Structure Time-Series model obtained from using the time-series data associated with keywords in the associated keyword set.

* * * * *